United States Patent
Malleni et al.

(10) Patent No.: US 11,894,983 B2
(45) Date of Patent: Feb. 6, 2024

(54) SIMULATION AND TESTING OF INFRASTRUCTURE AS A SERVICE SCALE USING A CONTAINER ORCHESTRATION ENGINE

(71) Applicant: RED HAT, INC., Raleigh, NC (US)

(72) Inventors: Sai Sindhur Malleni, Westford, MA (US); Venkata Anil Kumar Kommaddi, Bengaluru (IN)

(73) Assignee: Red Hat, Inc., Raleigh, NC (US)

( * ) Notice: Subject to any disclaimer, the term of this patent is extended or adjusted under 35 U.S.C. 154(b) by 318 days.

(21) Appl. No.: 16/820,624

(22) Filed: Mar. 16, 2020

(65) Prior Publication Data

US 2021/0288885 A1 Sep. 16, 2021

(51) Int. Cl.
*H04L 41/14* (2022.01)
*H04L 49/00* (2022.01)
(Continued)

(52) U.S. Cl.
CPC ........ *H04L 41/145* (2013.01); *G06F 9/45558* (2013.01); *H04L 49/70* (2013.01);
(Continued)

(58) Field of Classification Search
CPC ... H04L 41/145; H04L 49/70; H04L 63/0263; G06F 9/45558; G06F 2009/45562; G06F 2009/4557; G06F 2009/45595
See application file for complete search history.

(56) References Cited

U.S. PATENT DOCUMENTS 9,063,799 B1 * 6/2015 Chen ........................ G06F 8/76
9,384,025 B2 * 7/2016 Elzur .................. G06F 9/45558
(Continued)

FOREIGN PATENT DOCUMENTS

CN 108234187 A * 6/2018 ......... H04L 12/4633
CN 108540328 A 9/2018
(Continued)

OTHER PUBLICATIONS

Kang, Container—based Emulation of Network Control Plane, HotConNet 2017, ACM, Aug. 2017.*
(Continued)

*Primary Examiner* — Todd L Barker
(74) *Attorney, Agent, or Firm* — Womble Bond Dickinson (US) LLP (57) ABSTRACT

Systems and methods for scale testing infrastructure as a service systems are disclosed. A processing device generates a container image including a plurality of processes for providing compute functions and modifying a fake virtual driver with network switch functionality. The plurality of processes includes a compute process to create fake virtual machines using the modified fake virtual driver. The processing device generates a plurality of simulated compute nodes using the container image and generates a plurality of fake virtual machines using the modified fake virtual driver on one or more simulated compute nodes, scheduled as pods using a container orchestration engine. In this way, network and messaging traffic on the control plane is effectively simulated at scale. The modified fake driver enables network switch functionality so that network configuration for each fake virtual machine may be simulated, thereby mimicking the network actions of a virtual machine on a compute node.

17 Claims, 6 Drawing Sheets

(51) Int. Cl.
*H04L 9/40* (2022.01)
*G06F 9/455* (2018.01)

(52) U.S. Cl.
CPC .. *H04L 63/0263* (2013.01); *G06F 2009/4557* (2013.01); *G06F 2009/45562* (2013.01); *G06F 2009/45595* (2013.01)

(56) References Cited

U.S. PATENT DOCUMENTS

| | | | |
|---|---|---|---|
| 9,419,917 B2 | 8/2016 | Eaton et al. | |
| 10,394,971 B2 | 8/2019 | Cao et al. | |
| 10,514,994 B2 | 12/2019 | Idrisov et al. | |
| 2012/0290460 A1* | 11/2012 | Curry, Jr. | G06Q 30/08 705/37 |
| 2014/0331223 A1* | 11/2014 | Lee | G06F 9/45558 718/1 |
| 2016/0057226 A1* | 2/2016 | Bestler | H04L 67/1095 709/217 |
| 2016/0094483 A1* | 3/2016 | Johnston | H04L 67/10 709/226 |
| 2016/0364578 A1* | 12/2016 | Karn | G06F 21/6209 |
| 2018/0375897 A1* | 12/2018 | Kawasaki | H04L 63/1491 |
| 2019/0004865 A1* | 1/2019 | Ivanov | G06F 9/44536 |
| 2019/0155693 A1* | 5/2019 | Bomma | G06F 11/1417 |
| 2019/0394225 A1* | 12/2019 | Vajipayajula | G06F 16/9024 |
| 2020/0007405 A1* | 1/2020 | Chitalia | G06F 9/5072 |
| 2020/0076685 A1* | 3/2020 | Vaidya | H04L 12/4641 |
| 2020/0351708 A1* | 11/2020 | Maria | H04L 63/0209 |
| 2020/0403940 A1* | 12/2020 | Daly | G06F 12/10 |
| 2020/0412596 A1* | 12/2020 | Cherunni | G06F 9/5077 |
| 2021/0273811 A1* | 9/2021 | Burke | G06V 20/46 |
| 2021/0311453 A1* | 10/2021 | Li | G05B 19/4155 |

FOREIGN PATENT DOCUMENTS

| | | |
|---|---|---|
| CN | 108768685 A | 11/2018 |
| JP | 2019219743 A | 12/2019 |

OTHER PUBLICATIONS

Jarett, "Trusted Computing for Protecting Ad-hoc Routing", Proceedings of the 4th Annual Communication Networks and Services Research Conference, IEEE Publishing, 2006.*
Openstack, "Nova Fake Driver", Nov. 21, 2018, https://docs.openstack.org/kolla-ansible/latest/reference/compute/nova-fake-driver.html.*
Lucrezia et al., "Introducing Network—Aware Scheduling Capabilities in OpenStack", Apr. 2015, IEEE Publishing.*
Wang, "Combining Neutron and OpenDaylight for Management of Networking", Jul. 7, 2017.*
Han, "On the Resiliency of Virtual Network Functions", Jul. 2017.*
Segec et al., "Network Virtualization tools-analysis and application in higher education", 2019 17th International Conference on Emerging eLearning Technologies and Applicatoins (ICETA), Nov. 21, 2019.*
Open vSwitch Manual /http://www.openvswitch.org/ovs-vswitchd.conf.db.5.pdf, Sep. 2011.*
Mannhart, "Prototypical Implementation of a Cloud Experimentation Enviroment by an OpenStack Fake Driver", University of Zuirich , Jul. 1, 2015.*
Li et al., "EmuStack: An OpenStack-based DTN Network Emulation Platform, International Conference on Networking and Network Applications" Jul. 23, 2016, IEEE Publishing.*
Calinciuc et al., "OpenStack and Oocker: building a high-performance IaaS platform for interactive social media applications", 13th International Conference on Development and Application Systems, May 19, 2016.*
Kang et al., "Container and Microservice Driver Design for Cloud Infrastructure DevOps", IEEE International Conference on Cloud Engineering, Jun. 2016.*
Openstack/Nova, "https://github.com/openstack/nova/blob/master/nova/virt/fake.py," GitHub, Inc., 2020, 23 pages.

* cited by examiner

SIMULATION AND TESTING OF INFRASTRUCTURE AS A SERVICE SCALE USING A CONTAINER ORCHESTRATION ENGINE

TECHNICAL FIELD

Aspects of the present disclosure relate to infrastructure as a service (IaaS) systems, and more particularly, to scale testing of IaaS systems.

BACKGROUND

Infrastructure as a service (IaaS) is a form of cloud computing that provides virtualized computing resources over the internet. For example, in edge computing, IaaS allows multiple application service providers (ASPs) to use a virtualized resource (i.e., virtual machines (VMs) and virtual networks) for various applications and services on the common edge computing infrastructure. Edge computing architectures allow for many hundreds or thousands of edge sites by deploying hundreds or thousands of compute nodes remotely. Each compute node interacts with a central control plane over a routed L3 network. Distributed compute nodes allow compute node sites to be deployed closer to where they are used, and are generally deployed in greater numbers than would occur in a central data center.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

At a high level, a typical IaaS deployment has two components, controllers and compute nodes (e.g., hypervisors). The controllers may function as the brain of the IaaS deployment, as they run the APIs, schedulers and other services needed for cloud orchestration. The compute nodes run the virtualization services needed to launch and manage virtual machines. There is a significant amount of messaging and state reporting that happens between the controllers (also referred to as the control plane) and the compute nodes which increases with the scale of the IaaS deployment. Stated differently, as the scale of the deployment (e.g., number of compute nodes) increases, the load on the control plane increases which could lead to bottlenecks and in the worst case scenario, could make the IaaS deployment unresponsive. This could in turn affect already running workloads as well as the ability to launch new workloads.

Testing IaaS products at scale is challenging owing to the amount of hardware required to perform these tests. This leads to poor pre-release testing of the software, leaving multiple bottlenecks unexplored. However, the work of compute nodes in launching VMs and communicating bidirectionally with a control plane need not actually occur in order for the control plane to be given a realistic workload, if the message traffic that is normally passed between the control plane and compute nodes can be simulated. Deploying and running a control plane against a large number of hypervisors would allow developers to observe the effects of arbitrarily high numbers of compute nodes on the control plane without requiring a full scale hardware environment.

The present disclosure addresses the above-noted and other deficiencies by using a processing device to generate a container image including a plurality of processes for providing virtual compute node functionality and modifying a fake virtual driver of a compute node with virtual switch-related functionality. The plurality of processes may include a compute process to create and terminate fake virtual machines using the modified fake virtual driver. The plurality of processes may further include a network service agent to interface with the compute process to simulate a network configuration of fake virtual machines and virtual switch daemons to enable virtual switch functionality and commands within a simulated compute node generated from the container. The processing device may generate a plurality of simulated compute nodes using the container image and generate a plurality of fake virtual machines on a simulated compute node of the plurality of simulated compute nodes using the modified fake virtual driver. The virtual network switch functionality may enable the modified fake driver to interact with the networking service agent and virtual switch daemons to simulate a network configuration of each fake virtual machine that is created on the simulated compute node, thereby simulating the interactions of the fake virtual machines with the simulated compute node. The plurality of simulated computed nodes generated by the processing device emulate messaging between the control plane and the compute plane, while the virtual switch functionality of the fake virtual driver emulates the networking actions between a fake virtual machine and the simulated compute node. By scaling the number of simulated compute nodes using pods and replicasets, a control plane may be scale tested without requiring additional hardware to implement compute nodes.

Figure 1:
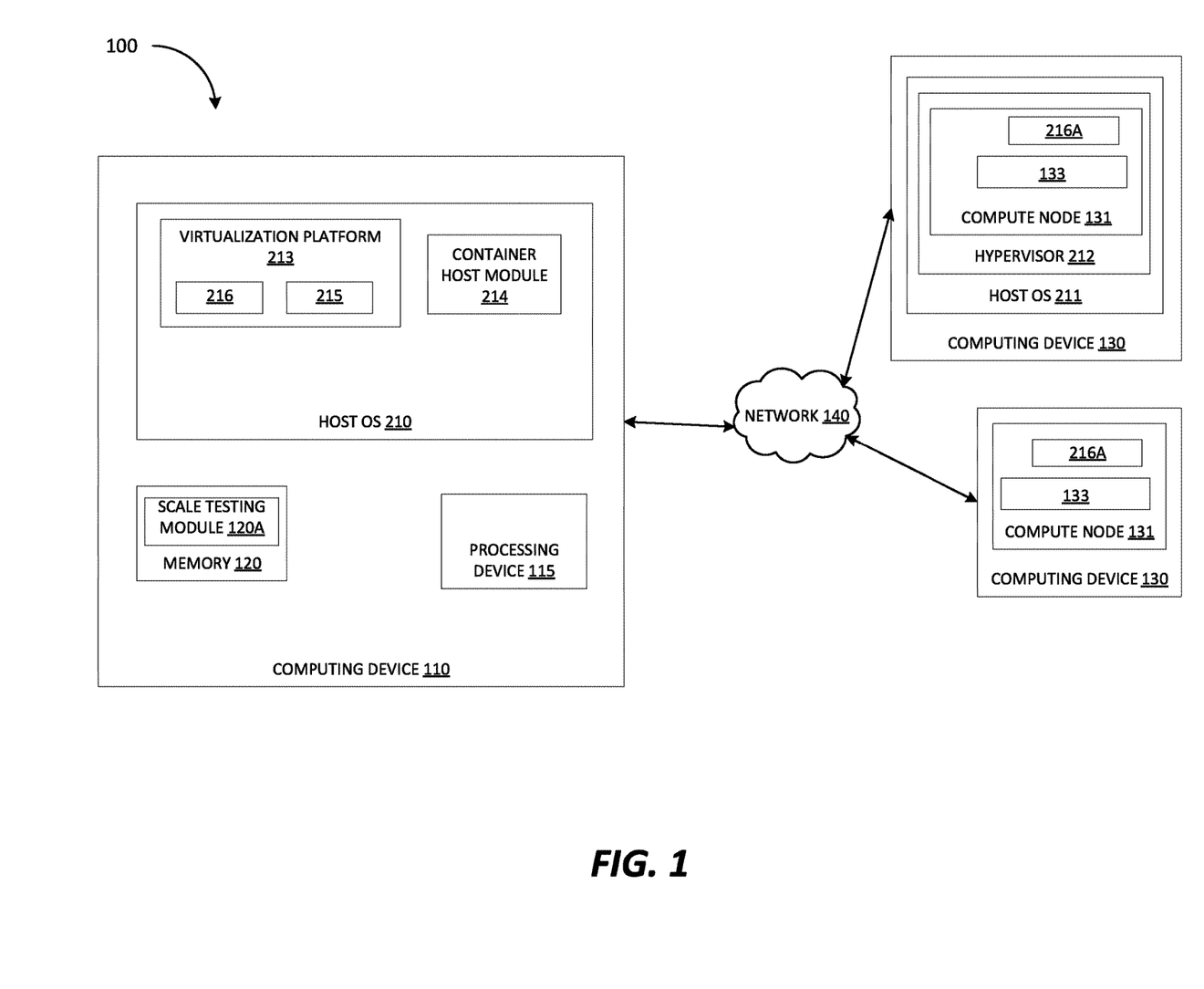
FIG. 1 is a block diagram that illustrates an example IaaS system, in accordance with some embodiments of the present disclosure.

FIG. 1 is a block diagram that illustrates an example IaaS system 100. As illustrated in FIG. 1, the IaaS system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi' hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 100. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 211 of computing device 130, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a virtualization platform) while computing devices 130 may each implement a compute node.

Figure 2:
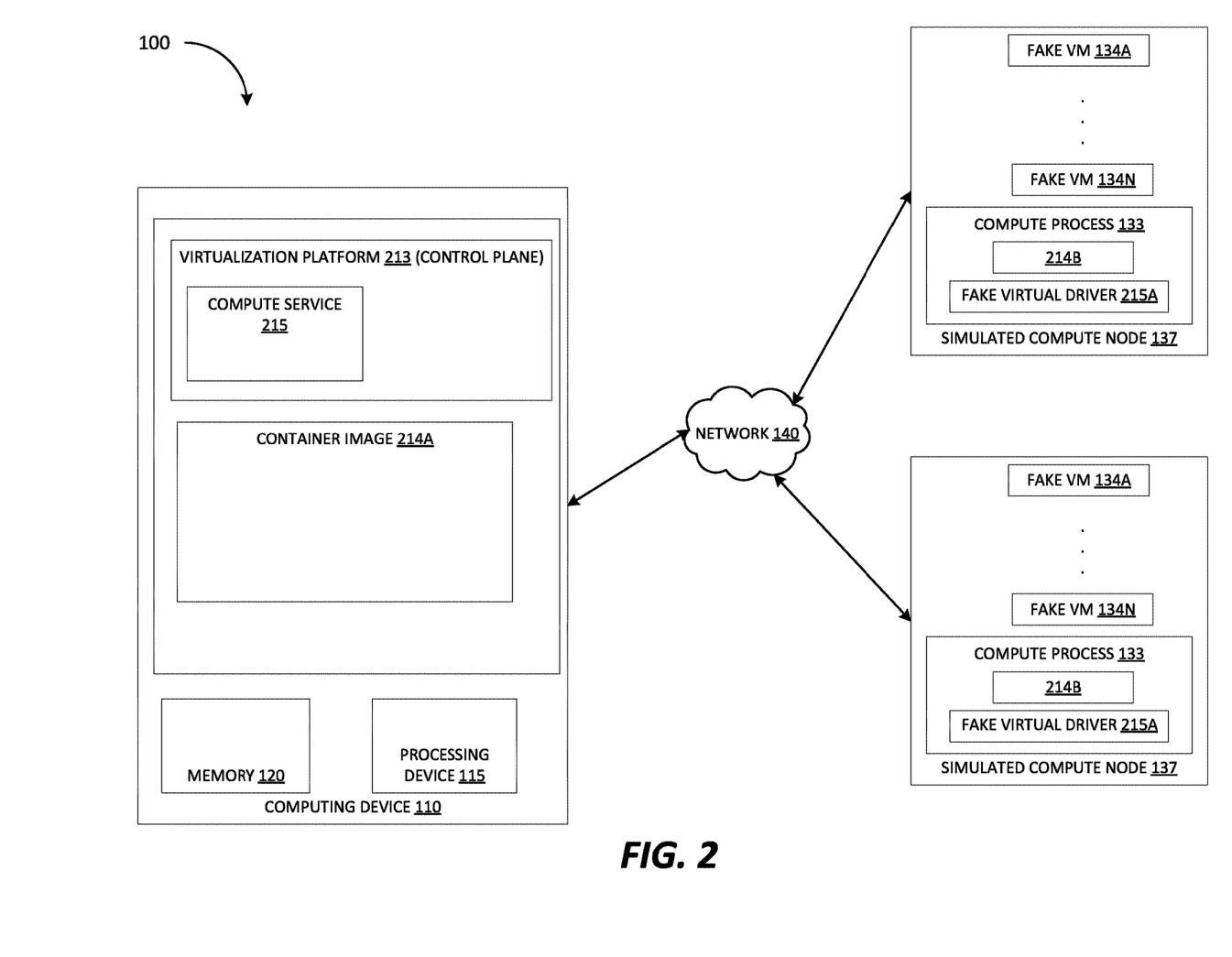
FIG. 2 is a block diagram that illustrates an example IaaS system, in accordance with some embodiments of the present disclosure.

The host OS 211 may include a hypervisor 212, which may also be known as a virtual machine monitor (VMM). In the example shown, hypervisor 212 may be a component of the host operating system 211. In another example, hypervisor 212 may run on top of host OS 211, or may run directly on host hardware without the use of a host operating system 211. Hypervisor 212 may manage system resources of computing device 130, including access to a processing device, memory, other storage devices (e.g., HDDs, SSDs), and/or other devices (e.g., sound cards, video cards, etc.) of computing device 130. The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a virtualization platform 213 such as the RedHat™ OpenStack™ platform. Hypervisor 212 may present other software (i.e., "guest" software) the abstraction of one or more virtual machines (VMs) that provide the same or different abstractions to various guest software (e.g., guest operating system, guest applications).

In some embodiments, a virtualization platform 213, such as the RedHat™ OpenStack™ platform, may execute on the host OS 210 of computing device 110 and the host OS 211 of computing device 130, as discussed in further detail herein. The virtualization platform 213 may use a consistent set of application programming interfaces (APIs) to abstract those virtual resources provided by the hypervisor 212 one step further into discrete pools that may be used to configure and deploy VMs that administrators and users may interact with directly. The virtualization platform 213 may include one or more deployment controllers (not shown) to handle the creation, deletion, placement, lifecycle, and functions of VMs as well as provisioning of such VMs with virtual applications. The deployment controllers may also manage the logical aspects of networking and virtual networks.

A typical IaaS deployment may include deployment controllers (also known as the control plane) and compute nodes, such as compute nodes 131A and 131B. The compute nodes 131 run the virtualization services needed to launch and manage virtual machines. For example, a compute node may be a physical server that acts as a hypervisor, and provides the processing capabilities required for running virtual machines in the environment. A compute node may also be implemented as a virtual server, logical container, or GPU, for example. There is a considerable amount of messaging and state reporting that happens between the control plane and the compute nodes, which increases with the scale of the network, or cloud deployment, as described herein.

The deployment controllers of the network virtualization platform 213 may execute a network service 216 that handles the creation and management of a virtual networking infrastructure in the OpenStack cloud. Elements of the virtual networking infrastructure may include for example networks, subnets, and routers along with advanced services such as firewalls or virtual private networks (VPN). Such OpenStack networking provides cloud administrators with flexibility in deciding which individual services should run on which physical systems. All service daemons can be run on a single physical host for evaluation purposes. Alternatively, each service can have its own physical host or even be replicated across multiple hosts for redundancy. The networking service 216 may include an OvS networking service agent 216A which is a service that runs on each compute node 131 to perform local networking configuration for that node's virtual machines and networking services.

The deployment controllers of the virtualization platform 213 may also execute a compute service 215 that provides virtual machines on demand. The compute service 215 may schedule virtual machines to run on a set of compute nodes (such as physical servers, virtual servers, logical containers, and GPUs) by defining drivers that interact with underlying virtualization mechanisms, and expose the functionality to the other components of the network virtualization platform 213. Given sufficient network bandwidth and compute power, the compute service 215 is designed to scale horizontally without restriction, and can download images to launch virtual machine or container instances as required, as discussed in further detail herein. As discussed herein, the compute service 215 manages scheduling, creation, and deletion of virtual machines, and includes an OpenStack compute component 133 (also referred to as a compute process 133) that is local to a compute node 131 and handles execution of the virtual machines on the compute node 131 including interacting with the virtualization mechanism of the compute node 131 (e.g., a hypervisor 212) to bring up new virtual machines, and ensures that the state is maintained in a compute database (not shown).

Referring simultaneously to FIG. 2, the compute component 133 may include a fake virtual driver 215A, that provides a means to use bare metal devices without power management. The fake virtual driver may not include simulation of networking operations, but may simulate a virtual machine that has been launched and is reporting on its status by storing and reporting on an internal status data structure that does not actually correspond to any virtual machine.

Host OS 211 may also implement a container host module 214 (also referred to as a container orchestration engine), such as the Redhat™ OpenShift™ module, which may function to create and utilize containers. Container host 214 may provide an image-based deployment module for creating containers and may store one or more image files for creating container instances. Each image file may include a series of layers, which may be combined into a single image as discussed in further detail herein. A layer is created when the image changes. For example, whenever a user specifies a command, such as "run" or "copy," a new layer may be created.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

When a user/administrator wishes to test the scaling capability of IaaS system 100, computing device 110 may execute scale testing module 120A to perform one or more of the functions described herein. Computing device 130 may modify the fake virtual driver 215A of the compute process 133 so that it may form the basis of a simulated compute node deployed from a container image as discussed in further detail herein. The scale testing module 120A allows running simulated compute nodes 137 using a replicaset, deployed from a container image 214A that includes the modified fake virtual driver 214B to simulate networking actions between a virtual machine and compute node. More specifically, computing device 130 may modify the fake virtual driver 215A to include virtual switch functionality. For example, the computing device 130 may modify the fake driver 215A to include Open Virtual Switch (OvS)-related functionality. An OvS may be a multilayer virtual switch designed to enable massive network automation through programmatic extension, while still supporting standard management interfaces and protocols (e.g., NetFlow, sFlow, IPFIX, RSPAN, CLI, LACP, 802.1ag). The computing device 110 may define a container image 214A comprising layers that include the OpenStack compute component 133 having the modified fake driver 214B and an OvS networking service agent 216A of the networking service 216 as well as OvS daemons (e.g., the "OvS db server" and "OvS vswitchd" processes) that provide OvS functionality and commands (e.g., OvS-vsctl commands) within a simulated compute node created using the container image 214A. In a simulated compute node 137 created from the container image 214A, the OvS-related functionality may enable the modified fake driver 214B to interact with the OvS networking service agent 216A of the simulated compute node 137 as well as the OvS daemons themselves that run inside the simulated compute node 137 in order to simulate network configuration with each fake virtual machine 134 that is created on the simulated compute node 137. Stated differently, the modified fake virtual driver 214B mimics the networking actions between a newly launched virtual machine and the simulated compute node 137. In this way, the network interaction (e.g., messaging, traffic) between the simulated compute nodes 137 and the control plane may be simulated as closely as possible. The scale testing module 120A may use a replicaset in the container host 214 to simulate a plurality of compute nodes, thereby simulating the control plane traffic, as discussed in further detail herein.

As discussed above, the modified fake driver 214B may not include simulation of networking operations, but may simulate a virtual machine that has been launched and is reporting on its status by storing and reporting on an internal status data structure that does not actually correspond to any virtual machine. Stated differently, the modified fake driver 214B does not interact with real virtual machines in any way, but merely accepts commands from the compute service 215 to spawn and destroy virtual machines and pretends it has done so by reporting the success of the commands along with a manufactured set of status information.

Figure 3:
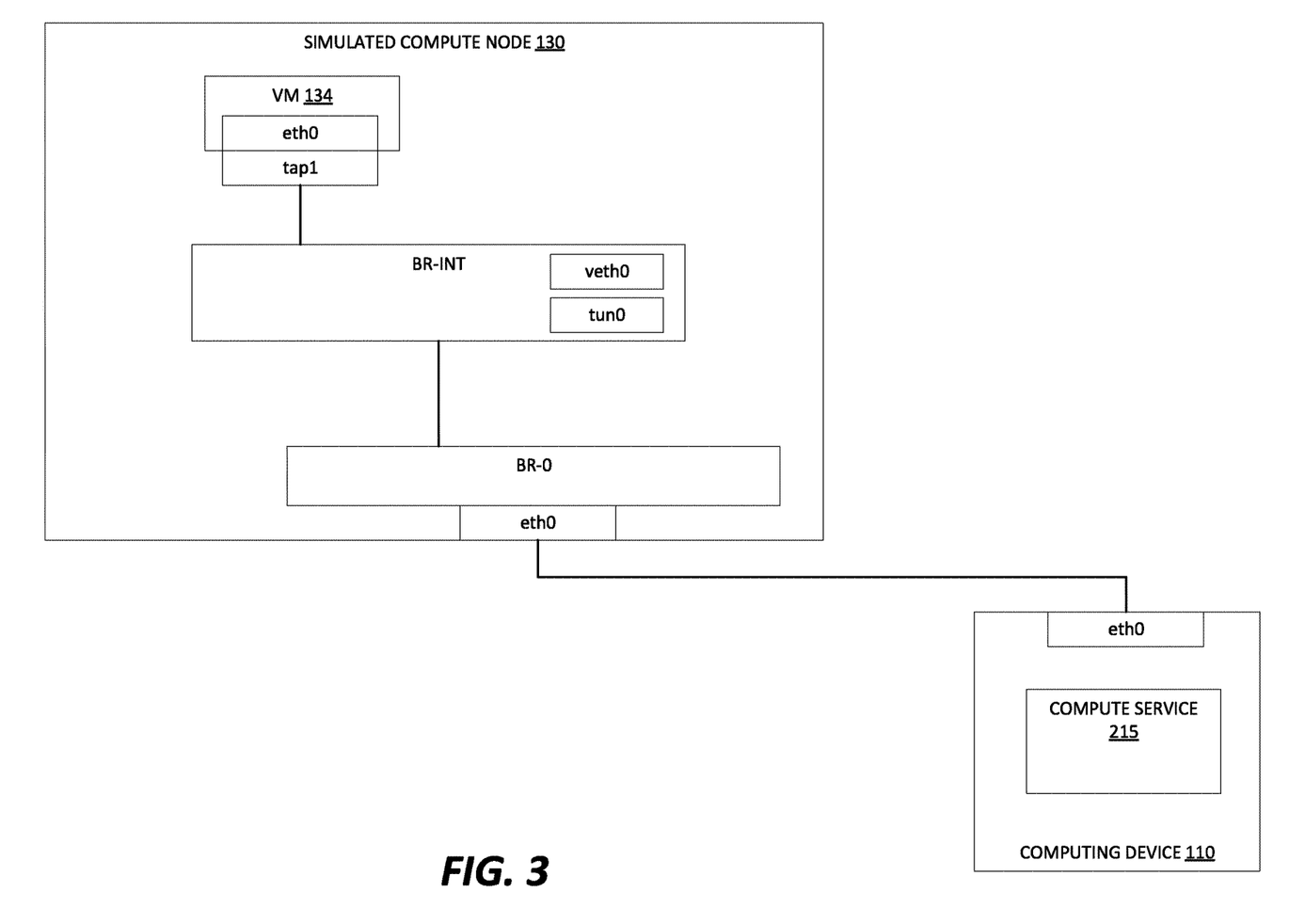
FIG. 3 is a block diagram illustrating the network configuration of an IaaS system, in accordance with some embodiments of the present disclosure.

Referring also to FIG. 3, container image 214A may include a startup script that uses OvS-vsctl commands to create the external network bridge (BR-0) over which virtual network devices within the simulated compute node 137 will interact with the outside network environment of the simulated compute node 137. The startup script may assist the simulated compute node 137 to correctly register with the control plane as an "actual" compute node so that the control plane believes that it has a real hypervisor. In some embodiments, the OpenStack compute component 133 including the modified fake driver 214B may also run OvS-vsctl commands inside the simulated compute node 137 when a fake virtual machine 134 that includes networking is spawned therein in order to simulate a network configuration of the fake virtual machine 134. The network service 216 may create real virtualized network devices within the simulated compute node 137 using OvS. Thus, when the OpenStack compute component 133 creates a fake virtual machine 134 (e.g., in response to a command from the compute service 215), it must 'plug' each of the "virtual machine's" virtual network interface cards (vNICs) into a virtual switch (e.g., the internal OpenStack bridge (BR-0)), and inform the internal OpenStack bridge about the OpenStack network port-id associated with each vNIC. This may be referred to as virtual interface (VIF) plugging. Thus, the OpenStack compute component 133 (using the modified fake driver 214B) will perform VIF plugging operations, including creating a virtual network kernel interface (e.g., OvS interface denoted as tap1 in FIG. 3, which simulates a link layer device and operates in layer 2 carrying Ethernet frames) on the internal OpenStack bridge (BR-INT). The OvS network service agent 216A in the simulated compute node 137 may monitor (using a monitoring process such as OvSdb-monitor) the internal OpenStack bridge (BR-INT) and upon detecting the interface being created, add corresponding OvS flows and firewall rules to the virtual machine 134 and inform the network service 216 executing on the control plane to set a port status for the simulated compute node 137 to "active." The OvS network service agent 216A may communicate with the network service 216 on the control plane via the external network bridge (BR-0) and physical interface eth0. The network service 216 on the control plane may then notify the compute service 215 on the control plane about the successful VIF plug event. In this way, the real network interaction which occurs within the control plane may be mimicked as closely as possible.

The internal OpenStack bridge (BR-INT) may be a Linux bridge that behaves like a network switch and may forward packets between interfaces that are connected to it. For example, the bridge BR-0 may include a TUN interface (tun0), which represents a network tunnel that simulates a network layer device and operates in layer 3 carrying IP packets. The bridge BR-0 may also include a virtual Ethernet (veth) interface which is a local Ethernet tunnel over which packets may be forwarded to a device with a corresponding veth interface.

Once the container image 214A is built with the computing process, the OVS network service agent and the modified fake virtual driver are pushed to a registry on the computing device 110. The container host module 214 may schedule the simulated compute nodes 130 as pods using the container image 214A with the aid of a replicaset. A pod may refer to one or more containers deployed together on one host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, then they are assigned to run on a node, and they run until their container(s) exit or they are removed for some other reason. Depending on their policy and exit code, pods may be removed after exiting, or may be retained to enable access to the logs of their containers (simulated compute nodes). The container host module 214 may define the entrypoint script of a pod to instruct the pod to configure itself as a unique simulated compute node with its own IP addresses and simulated network stacks and communicate with the internal API of the control plane.

The container host module 214 may scale the simulated compute nodes/pods by defining a replicaset. A replicaset is an object that ensures that a specified number of pod replicas are running at any given time. A replicaset fulfills its purpose by creating and deleting pods as needed to reach the desired number. So we are easily able to scale up from 0 simulated compute nodes to 1000s of simulated compute nodes in a matter of a few seconds using the replicaset. If pods exit or are deleted, the replication controller acts to instantiate more up to the defined number.

The scale testing module 120A (executed by the computing device 110) may launch one or more fake virtual machines on one or more of the simulated compute nodes 137 to mimic the network traffic on the control plane and the interaction between the control plane and each simulated compute node 137 as discussed herein.

In some embodiments, the IaaS system 100 of FIGS. 1A and 1B may be scale tested using an undercloud/overcloud configuration. The undercloud installs and configures the overcloud and provides planning functions for users to create and assign certain node roles. The undercloud has the capability to deploy a default set of nodes such as compute, controller, and various storage roles, but also provides the ability to use custom roles. The overcloud is the resulting OpenStack platform environment created using the undercloud. This includes different nodes roles that a user may define based on the OpenStack platform environment they aim to create. In some embodiments, the undercloud/overcloud may be set up with 1 director node (undercloud), 3 physical machines (computing devices) to implement the control plane, and a fourth physical machine, which may be a bare metal node, to implement the compute nodes. The bare metal node may be used to supply the compute service, network service, and OvS configuration files as well as RPMs and host files to be used for building the container image 214A for the simulated compute nodes. The container host 214 may use a replicaset to bring up a series of physical "worker" nodes to deploy the container image 214A into containers to generate the simulated compute nodes 137.

By deploying the simulated compute nodes directly from the bare metal node, the traditional director node pathway to deploying compute nodes may be bypassed. Instead, the compute nodes 137 may spin themselves up (as discussed in further detail herein) and self-report back to the control plane as they normally would.

Figure 4:
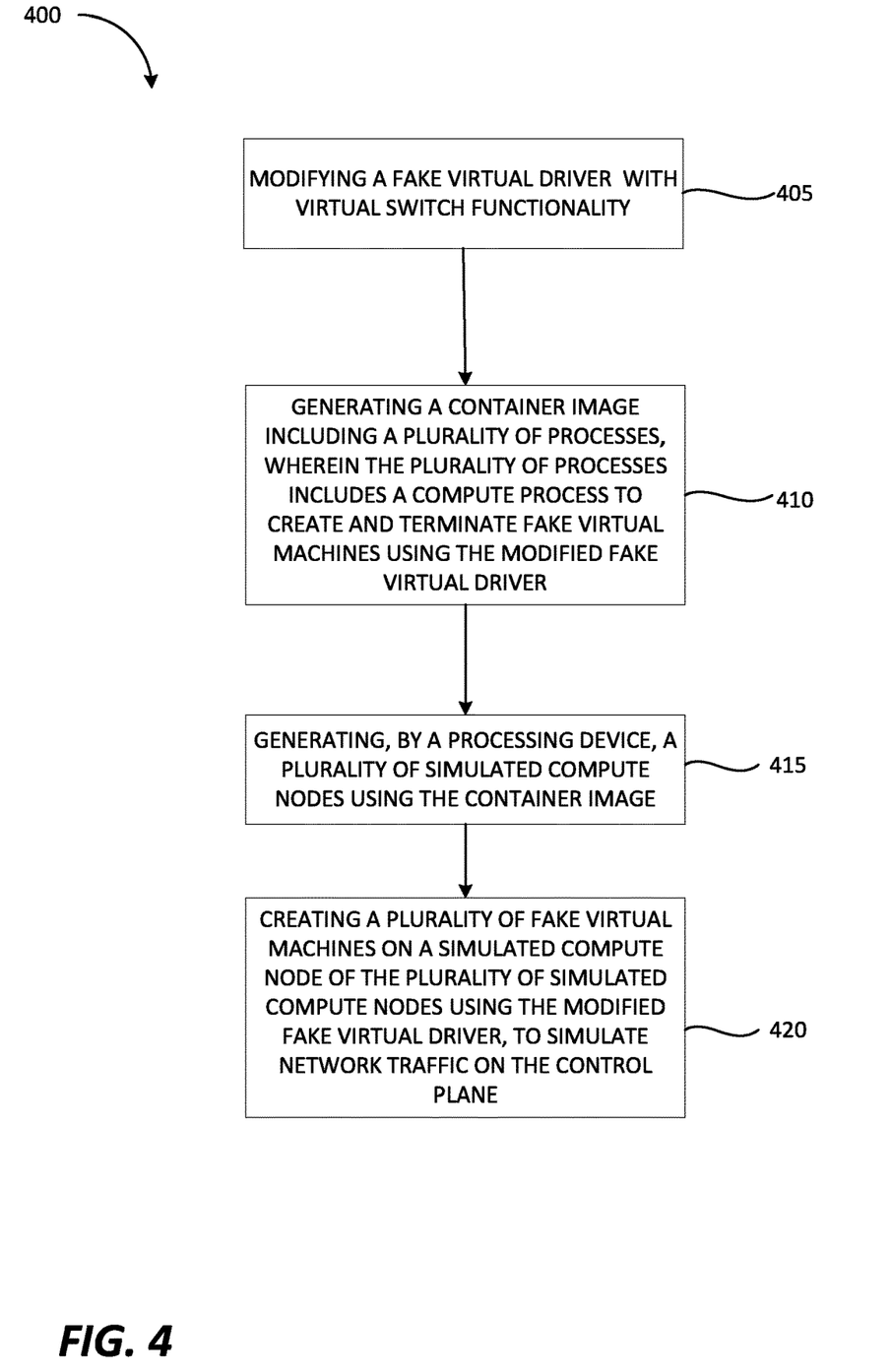
FIG. 4 is a flow diagram of a method for testing the scale capabilities of an IaaS system, in accordance with some embodiments of the present disclosure.

FIG. 4 is a flow diagram of a method 400 of simulating the scale of an IaaS system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIGS. 1a and 1b).

The method 400 begins at block 405, where computing device 110 may modify a fake virtual driver of a network virtualization control plane with virtual switch functionality. For example, the computing device 110 may modify the fake driver 215A to include Open Virtual Switch (OvS)-related functionality. An OvS may be a multilayer virtual switch designed to enable massive network automation through programmatic extension, while still supporting standard management interfaces and protocols (e.g., NetFlow, sFlow, IPFIX, RSPAN, CLI, LACP, 802.1ag). Computing device 110 may modify the fake virtual driver 215A of the computing service so that it may form the basis of a simulated compute node deployed from a container image as discussed in further detail herein. The modified fake driver 214B may allow simulated compute nodes deployed from a container image 214A that includes the modified fake driver 214B to exist as running containers with their own IP addresses and simulated network stacks.

At block 410, computing device 110 may define a container image 214A comprising layers that include the OpenStack compute component 133 having the modified fake driver 214B and an OvS networking service agent 216A of the network service 216 as well as OvS daemons (e.g., the "OvS db server" and "OvS vswitchd" processes) that provide OvS functionality and commands (e.g., OvS-vsctl commands) within a simulated compute node 137 created using the container image 214A. In simulated compute node 137 created from the container image 214A, the OvS-related functionality may enable the modified fake driver 214B to interact with the OvS networking service agent 216A of the compute node 130 as well as OvS daemons themselves that run inside the compute node 130 in order to simulate network configuration with each fake virtual machine 134 that is created on the simulated compute node 137. At block 415, a processing device generates a plurality of simulated compute nodes and in this way, the network interaction (e.g., messaging, traffic) between the simulated compute nodes 137 and the control plane may be simulated as closely as possible.

Figure 5:
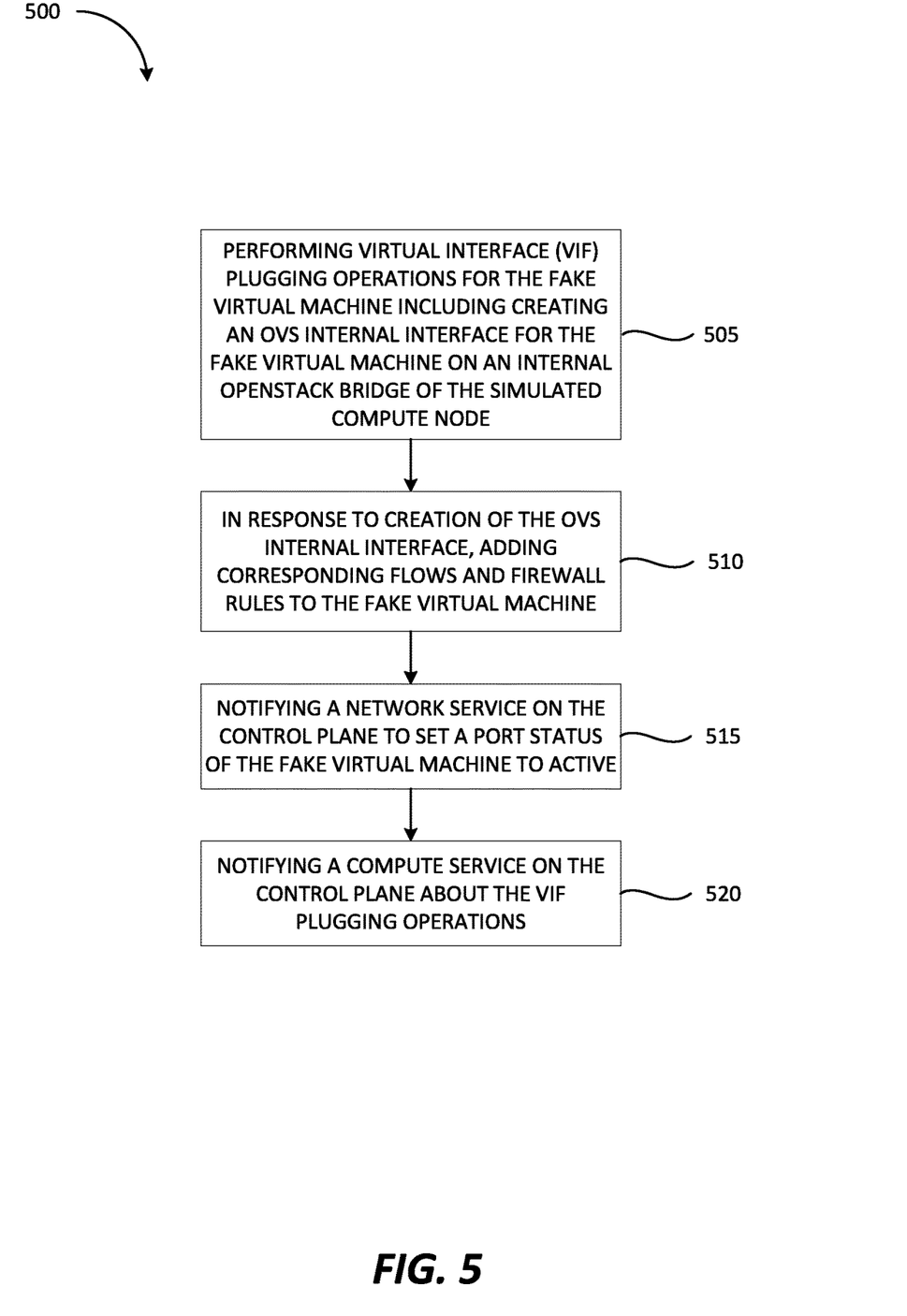
FIG. 5 is a flow diagram of a method for simulating the network configuration of a fake virtual machine, in accordance with some embodiments of the present disclosure.

FIG. 5 is a flow diagram of a method 500 of simulating network configuration with a fake virtual machine, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 illustrated in FIGS. 1A and 1B).

In some embodiments, the OpenStack compute component 133 including the modified fake driver 214B may run OvS-vsctl commands inside the simulated compute node when a fake virtual machine 134 that includes networking is spawned therein. Referring also to FIG. 3, container image 214A may also include a startup script that uses OvS-vsctl to create the external network bridge (BR-0) over which virtual network devices within the simulated compute node 137 will interact with the outside network environment of the simulated compute node 137. The network service 216 may create real virtualized network devices within the simulated compute node 137 using OvS. At block 505, when the OpenStack compute component 133 creates a fake virtual machine 134 (e.g., in response to a command from the compute service 215), it may perform virtual interface (VIF) plugging operations. More specifically, the OpenStack compute component 133 may 'plug' each of the virtual machine's virtual network interface cards (vNICs) into an OpenStack network controlled virtual switch (e.g., the internal OpenStack bridge (BR-INT)), and inform the internal OpenStack bridge (BR-INT) about the OpenStack network port-id associated with each vNIC. Thus, the OpenStack compute component 133 (using the modified fake driver 214B) may perform VIF plugging operations, including creating a virtual network kernel interface (e.g., OvS interface denoted as tap1 in FIG. 3, which simulates a link layer device and operates in layer 2 carrying Ethernet frames) on the internal OpenStack bridge (BR-INT). The OvS network service agent 216A in the simulated compute node 137 may monitor (using a monitoring process such as OvSdb-monitor) the internal OpenStack bridge (BR-INT) and at block 510, upon detecting the tap1 interface being created, add corresponding OvS flows and firewall rules to the virtual machine 134 and inform the network service 216 executing on the control plane to set a port status for the simulated compute node 137 to "active." OvS network service agent 216A may communicate with the network service 216 on the control plane via the external network bridge (BR-0) and physical interface eth0. At block 520, the network service on the control plane may then notify the compute service 215 on the control plane about the successful VIF plug event. In this way, the real network interaction which occurs within the control plane may be mimicked as closely as possible.

Referring back to FIG. 4, once the container image 214A is built, it is pushed to a registry on the computing device 110. At block 415, the container host module 214 may schedule the simulated compute nodes 130 as pods using the container image 214A. A pod may refer to one or more containers deployed together on one host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, then they are assigned to run on a node, and they run until their container(s) exit or they are removed for some other reason. Depending on their policy and exit code, pods may be removed after exiting, or may be retained to enable access to the logs of their containers (simulated compute nodes). The container host module 214 may define the entrypoint script of a pod to instruct the pod to configure itself as a unique simulated compute node and communicate with the internal API of the deployment controllers.

At block 420, the computing device 110 may launch one or more fake VMs on one or more of the simulated compute nodes 130 to mimic the network traffic on the control plane and the interaction between the control plane and the simulated compute node 137 as discussed herein.

Figure 6:
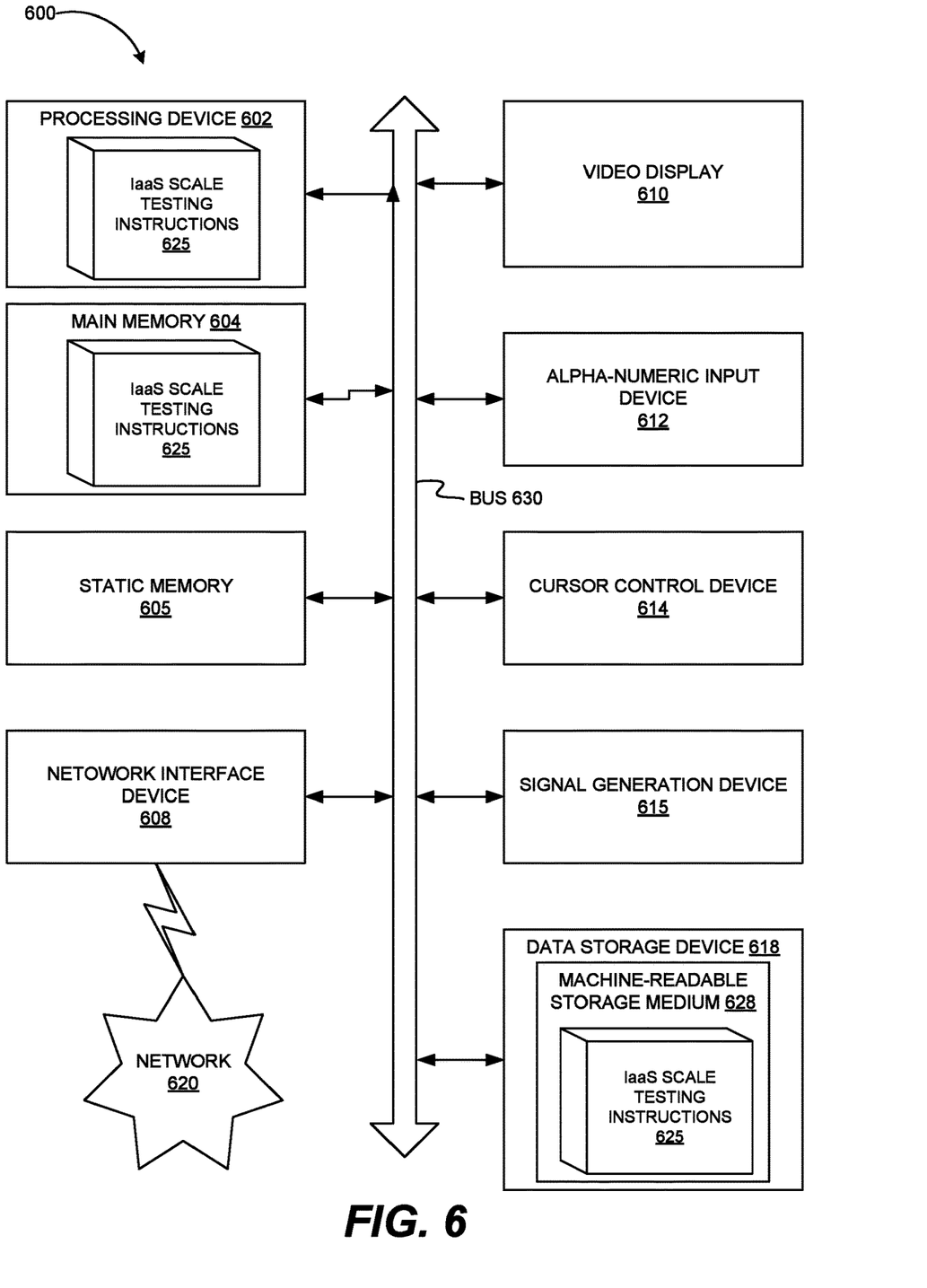
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. For example, computing device 600 may modify a fake virtual driver of a control plane with virtual switch-related functionality and generate a container image including a plurality of processes for providing virtual network functionality. The plurality of processes may include a compute process to create and terminate fake virtual machines using the modified fake virtual driver. The plurality of processes may further include a network service agent to interface with the compute process to simulate a network configuration of fake virtual machines and virtual switch daemons to enable virtual switch functionality and commands within a simulated compute node generated from the container. The computing device 600 may generate a plurality of simulated compute nodes using the container image and generate a plurality of fake virtual machines on a simulated compute node of the plurality of simulated compute nodes using the modified fake virtual driver. The virtual network switch functionality may enable the modified fake driver to interact with the networking service agent and virtual switch daemons to simulate a configuration of each fake virtual machine that is created on the simulated compute node, thereby simulating network traffic on the control plane as well as the interaction between simulated compute nodes and the control plane.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of IaaS scale testing instructions 625, e.g., instructions for carrying out the operations described herein, in accordance with one or more aspects of the present disclosure. IaaS scale testing instructions 625 may also reside, completely or at least partially, within main memory 604 and/or within processing device 602 during execution thereof by computing device 600, main memory 604 and processing device 602 also constituting computer-readable media. The IaaS scale testing instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    modifying a simulated virtual driver with virtual switch functionality to emulate networking actions between a plurality of virtual machines;
    generating a container image including the modified simulated virtual driver and a plurality of processes, wherein the plurality of processes includes a compute process to create and terminate simulated virtual machines using the modified simulated virtual driver;
    generating, by a processing device, a plurality of simulated compute nodes using the container image, wherein generating the plurality of simulated compute nodes comprises scheduling, using a container orchestration engine, the plurality of simulated compute nodes as one or more pods, each of the one or more pods having a first script to configure each of the one or more pods as a simulated compute node with its own internet protocol (IP) address, a simulated network stack, and a second script to communicate with the control plane; and
    creating a plurality of simulated virtual machines on a simulated compute node of the plurality of simulated compute nodes using the modified simulated virtual driver to simulate network traffic on a control plane, wherein the modified simulated virtual driver uses the virtual switch functionality to simulate a network configuration of each simulated virtual machine that is created on the simulated compute node.

2. The method of claim 1, wherein the plurality of processes further includes:
    one or more processes to enable the virtual switch functionality and commands within the simulated compute node; and
    a network service agent that interacts with the modified simulated virtual driver to simulate the network configuration of each simulated virtual machine that is created on the simulated compute node and thereby simulate network traffic on the control plane, wherein the virtual network switch functionality allows the modified simulated virtual driver to interact with the network service agent.

3. The method of claim 2, wherein simulating the network configuration of each simulated virtual machine that is created on the simulated compute node comprises:
    performing virtual interface (VIF) plugging operations for the simulated virtual machine including creating an open virtual switch (OvS) internal interface for the simulated virtual machine on an internal OpenStack bridge of the simulated compute node;
    in response to creation of the OvS internal interface, adding corresponding flows and firewall rules to the simulated virtual machine; and
    notifying a network service on the control plane about the VIF plugging operations.

4. The method of claim 1, wherein generating the plurality of simulated compute nodes further comprises: defining a replicaset object with a specified number of simulated compute nodes to maintain, wherein in response to detecting that one or more simulated compute nodes have been deleted, the replicaset object creates additional simulated compute nodes to maintain the specified number of simulated compute nodes.

5. The method of claim 1, wherein each simulated compute node is generated independently of the control plane, self-reports its existence to the control plane, and generates messaging traffic between each simulated compute node and the control plane.

6. The method of claim 1, wherein the modified simulated virtual driver stores an internal status data structure and reports to the control plane about the internal status data structure, and wherein the internal status data structure does not correspond to any of the plurality of simulated virtual machines.

7. A system comprising:
    a memory; and
    a processing device operatively coupled to the memory, the processing device to:
        modify a simulated virtual driver with virtual switch functionality to emulate networking actions between a plurality of virtual machines;
        generate a container image including the modified simulated virtual driver and a plurality of processes, wherein the plurality of processes includes a compute process to create and terminate simulated virtual machines using the modified simulated virtual driver;
        generate a plurality of simulated compute nodes using the container image, wherein to generate the plurality of simulated compute nodes is further to schedule, using a container orchestration engine, the plurality of simulated compute nodes as one or more pods, each of the one or more pods having a first script to configure each of the one or more pods as a simulated compute node with its own internet protocol (IP) address, a simulated network stack, and a second script to communicate with the control plane; and create a plurality of simulated virtual machines on a simulated compute node of the plurality of simulated compute nodes using the modified simulated virtual driver, to simulate network traffic on a control plane, wherein the modified simulated virtual driver uses the virtual switch functionality to simulate a network configuration of each simulated virtual machine that is created on the simulated compute node.

8. The system of claim 7, wherein the plurality of processes further includes:

one or more processes to enable the virtual switch functionality and commands within the simulated compute node; and a network service agent that interacts with the modified simulated virtual driver to simulate the network configuration of each virtual machine that is created on the simulated compute node and thereby simulate network traffic on the control plane, wherein the virtual network switch functionality allows the modified simulated virtual driver to interact with the network service agent.

9. The system of claim 8, wherein to simulate the network configuration of each simulated virtual machine that is created on the simulated compute node, the processing device is to:

perform virtual interface (VIF) plugging operations for the simulated virtual machine including creating an open virtual switch (OvS) internal interface for the simulated virtual machine on an internal OpenStack bridge of the simulated compute node;

in response to creation of the OvS internal interface, add corresponding flows and firewall rules to the simulated virtual machine; and notify a network service on the control plane about the VIF plugging operations.

10. The system of claim 7, wherein to generate the plurality of simulated compute nodes, the processing device is further to: define a replicaset object with a specified number of simulated compute nodes to maintain, wherein in response to detecting that one or more simulated compute nodes have been deleted, the replicaset object creates additional simulated compute nodes to maintain the specified number of simulated compute nodes.

11. The system of claim 7, wherein each simulated compute node is generated independently of the control plane, self-reports its existence to the control plane, and generates messaging traffic between each simulated compute node and the control plane.

12. The system of claim 7, wherein the modified simulated virtual driver stores an internal status data structure and reports to the control plane about the internal status data structure, and wherein the internal status data structure does not correspond to any of the plurality of simulated virtual machines.

13. A non-transitory computer readable medium having instruction stored thereon that, when executed by a processing device, cause the processing device to:

modify a simulated virtual driver with virtual switch functionality to emulate networking actions between a plurality of virtual machines;

generate a container image including the modified simulated virtual driver and a plurality of processes, wherein the plurality of processes includes a compute process to create and terminate simulated virtual machines using the modified simulated virtual driver;

generate, by the processing device, a plurality of simulated compute nodes using the container image, wherein to generate the plurality of simulated compute nodes is further to schedule, using a container orchestration engine, the plurality of simulated compute nodes as one or more pods, each of the one or more pods having a first script to configure each of the one or more pods as a simulated compute node with its own internet protocol (IP) address, a simulated network stack, and a second script to communicate with the control plane; and create a plurality of simulated virtual machines on a simulated compute node of the plurality of simulated compute nodes using the modified simulated virtual driver, to simulate network traffic on a control plane, wherein the modified simulated virtual driver uses the virtual switch functionality to simulate a network configuration of each simulated virtual machine that is created on the simulated compute node.

14. The non-transitory computer readable medium of claim 13, wherein the plurality of processes further includes:

one or more processes to enable the virtual switch functionality and commands within the simulated compute node; and a network service agent that interacts with the modified simulated virtual driver to simulate the network configuration of each simulated virtual machine that is created on the simulated compute node and thereby simulate network traffic on the control plane, wherein the virtual network switch functionality allows the modified simulated virtual driver to interact with the network service agent.

15. The non-transitory computer readable medium of claim 14, wherein to simulate the network configuration of each simulated virtual machine that is created on the simulated compute node, the processing device is to:

perform virtual interface (VIF) plugging operations for the simulated virtual machine including creating a open virtual switch (OvS) internal interface for the simulated virtual machine on an internal OpenStack bridge of the simulated compute node;

in response to creation of the OvS internal interface, add corresponding flows and firewall rules to the simulated virtual machine; and notify a network service on the control plane about the VIF plugging operations.

16. The non-transitory computer readable medium of claim 13, wherein to generate the plurality of simulated compute nodes, the processing device is further to: define a replicaset object with a specified number of simulated compute nodes to maintain, wherein in response to detecting that one or more simulated compute nodes have been deleted, the replicaset object creates additional simulated compute nodes to maintain the specified number of simulated compute nodes.

17. The non-transitory computer readable medium of claim 13, wherein each simulated compute node is generated independently of the control plane and self-reports its existence to the control plane.

* * * * *